United States Patent
Mornatta et al.

(10) Patent No.: US 9,575,390 B2
(45) Date of Patent: Feb. 21, 2017

(54) HIGHER ORDER SEEDLESS RAMAN PUMPING

(71) Applicant: IPG (IPG Photonics Corporation), Oxford, MA (US)

(72) Inventors: Cristiano Mornatta, Milan (IT); Alessandro Festa, Milan (IT)

(73) Assignee: IPG PHOTONICS CORPORATION, Oxford, MA (US)

( * ) Notice: Subject to any disclaimer, the term of this patent is extended or adjusted under 35 U.S.C. 154(b) by 0 days.

(21) Appl. No.: 15/080,914

(22) Filed: Mar. 25, 2016

(65) Prior Publication Data

US 2016/0294153 A1    Oct. 6, 2016

Related U.S. Application Data

(60) Provisional application No. 62/141,155, filed on Mar. 31, 2015.

(51) Int. Cl.
*H01S 3/30* (2006.01)
*G02F 1/365* (2006.01)
(Continued)

(52) U.S. Cl.
CPC .............. *G02F 1/365* (2013.01); *G02B 6/2938* (2013.01); *G02F 1/353* (2013.01); *H01S 3/0675* (2013.01); *H01S 3/06783* (2013.01); *H01S 3/302* (2013.01)

(58) Field of Classification Search
CPC ........ H01S 3/30; H01S 3/067; H04B 10/2916; G02F 1/35; G02F 1/365; G02B 6/293
(Continued)

(56) References Cited

U.S. PATENT DOCUMENTS 6,147,794 A * 11/2000 Stentz .................... H01S 3/302
                                                                  359/334
6,212,310 B1 * 4/2001 Waarts ............... G02B 6/29319
                                                                  372/43.01
(Continued)

FOREIGN PATENT DOCUMENTS

EP         1553666 B1      5/2006

OTHER PUBLICATIONS

International Search Report and Written Opinion for International Application No. PCT/US2016/024843, dated Jun. 24, 2016.
(Continued)

*Primary Examiner* — Daniel Petkovsek
(74) *Attorney, Agent, or Firm* — Joshua D. Isenberg; JDI Patent

(57) ABSTRACT

An optical fiber is optically coupled to an optical multiplexer. First and second wavelength-selective reflectors are formed onto the optical fiber. The first wavelength selective reflector is configured to reflect radiation of a first wavelength and the second wavelength reflective selector is configured to reflect radiation of a second wavelength that is longer than the first wavelength. A resonant laser cavity is formed between transmission fiber acting as distributed Rayleigh mirror and first and second wavelength selective reflectors. The first and second wavelength-selective reflectors and the optical fiber are configured such that Raman scattering and gain in the transmission fiber converts pump radiation at a pump wavelength less than the first wavelength to radiation of the first wavelength and also convert radiation of the first wavelength to radiation of the second wavelength.

16 Claims, 2 Drawing Sheets

(51) Int. Cl.
   *G02F 1/35* (2006.01)
   *H01S 3/067* (2006.01)
   *G02B 6/293* (2006.01)

(58) Field of Classification Search
   USPC .......................................................... 359/327
   See application file for complete search history.

(56) References Cited

U.S. PATENT DOCUMENTS

| | | |
|---|---|---|
| 6,292,288 B1 | 9/2001 | Akasaka et al. |
| 6,434,172 B1 * | 8/2002 | DiGiovanni ............ H01S 3/302 |
| | | 372/102 |
| 6,480,326 B2 * | 11/2002 | Papernyi ............ H04B 10/2916 |
| | | 359/334 |
| 6,532,101 B2 * | 3/2003 | Islam ................ H04B 10/2916 |
| | | 359/334 |
| 7,133,192 B2 * | 11/2006 | Tanaka .................... H01S 3/302 |
| | | 359/334 |
| 7,508,575 B2 * | 3/2009 | Papernyi .............. H04B 10/291 |
| | | 359/334 |
| 7,917,030 B2 | 3/2011 | BuAbbud et al. |
| 8,576,481 B2 * | 11/2013 | Zaacks .................. H01S 3/0014 |
| | | 359/341.32 |
| 2004/0190122 A1 | 9/2004 | Tanaka et al. |
| 2005/0100343 A1 | 5/2005 | Yoshida |
| 2006/0087722 A1 | 4/2006 | Krizan et al. |
| 2006/0209394 A1 | 9/2006 | Papernyi et al. |
| 2009/0142061 A1 | 6/2009 | BuAbbud et al. |

OTHER PUBLICATIONS

U.S. Appl. No. 62/141,155, to Cristiano Mornatto, filed Mar. 31, 2015.

* cited by examiner

HIGHER ORDER SEEDLESS RAMAN PUMPING

CLAIM OF PRIORITY

This application claims the benefit of U.S. Provisional Patent Application No. 62/141,155, filed Mar. 31, 2015, the entire contents of which are incorporated herein by reference in their entirety.

FIELD OF THE INVENTION

Aspects of the present disclosure relate to optical fiber Raman amplifiers and to optical fiber communication systems comprising such amplifiers and more specifically to pumping the transmission fiber of an optical telecommunication system.

BACKGROUND OF THE INVENTION

In a Raman amplifier, the signal is intensified by Raman amplification, which is based on stimulated Raman scattering (SRS). This type of scattering occurs in a nonlinear medium when an incident pump photon at higher frequency $\omega_p$ releases its energy to create another photon (signal) of reduced energy at lower frequency $\omega_s$ (inelastic scattering); the remaining energy $\omega_p$-$\omega_s$ is absorbed by the medium in the form of molecular vibrations (optical phonons). Raman amplification effect can be achieved by a nonlinear interaction between a signal and a pump laser within an optical fiber. Raman amplification is used in optical telecommunications to provide all-band wavelength coverage and in-line distributed signal amplification. In particular, optical transmission fiber can be used as a nonlinear medium for Raman amplification. Pumping the transmission fiber with radiation of the right frequency produces amplification of optical signals travelling in the transmission fiber.

The pump light may be coupled into the transmission fiber and travel in the same direction as the signal (co-directional pumping), in the opposite direction (contra-directional pumping) or both. Contra-directional pumping is more common as the transfer of noise from the pump to the signal is reduced.

The principal advantage of Raman amplification is its ability to provide distributed amplification within the transmission fiber, thereby increasing the length of spans between amplifier and regeneration sites. The amplification bandwidth of Raman amplifiers is defined by the pump wavelengths utilized and so amplification can be provided over wider, and different, regions than may be possible with other amplifier types which rely on dopants and device design to define the amplification 'window'.

Raman amplifiers have some fundamental advantages. First, Raman gain exists in every fiber, which provides a cost-effective means of upgrading from the terminal ends. Second, the gain is non-resonant, which means that gain is available over the entire transparency region of the fiber ranging from approximately 0.3 to 2 μm. A third advantage of Raman amplifiers is that the gain spectrum can be tailored by adjusting the pump wavelengths. For instance, multiple pump lines can be used to increase the optical bandwidth, and the pump distribution determines the gain flatness. Another advantage of Raman amplification is that it is a relatively broad-band amplifier with a bandwidth >5 THz, and the gain is reasonably flat over a wide wavelength range.

To produce Raman gain in the transmission fiber for signals in a particular wavelength band requires that the fiber be pumped at a relatively high-power level (hundreds of milliwatts) at a wavelength, or wavelengths, shifted down from the signal wavelength(s) by an amount corresponding to the characteristic Raman shift of the fiber. For typical silica fiber, the Raman gain spectrum consists of a relatively broad band centered at a shift of about 440 $cm^{-1}$. Therefore, to provide gain for signals in the C-band (1530 to 1565 nm) for example, requires pump energy in the 1455-nm region.

In typical prior-art distributed Raman amplification embodiments, the output of a high-power laser source (e.g. a Raman fiber laser with a center wavelength of ~1455 nm) or a group of multiplexed laser diodes with wavelengths in the 1455-nm region is launched from a receiving or repeater terminal to pump the fiber and provide gain for the incoming C-band signals. To extend the amplification bandwidth for high-capacity WDM systems, the launched pump spectrum is broadened by using multiple Raman lasers (each with a predetermined power and wavelength) or by multiplexing additional laser diodes of specific wavelength and power.

In a Raman laser the fundamental light-amplification mechanism is stimulated Raman scattering. In contrast, most "conventional" lasers rely on stimulated electronic transitions to amplify light. Raman lasers are optically pumped. However, this pumping does not produce a population inversion as in conventional lasers. Rather, pump photons are absorbed and "immediately" re-emitted as lower-frequency laser-light photons ("Stokes" photons) by stimulated Raman scattering. The difference between the two photon energies is fixed and corresponds to a vibrational frequency of the gain medium. This makes it possible, in principle, to produce arbitrary laser-output wavelengths by choosing the pump-laser wavelength appropriately. This is in contrast to conventional lasers, in which the possible laser output wavelengths are determined by the emission lines of the gain material.

In fiber-based Raman lasers, tight spatial confinement of the pump light can be maintained over relatively large distances. This significantly lowers threshold pump powers down to practical levels and furthermore enables continuous-wave operation. For optical telecommunications applications it is desirable to design Raman lasers with the highest possible launch power into the transmission fiber to stimulate the highest achievable Gain. A higher Raman Gain achieved into the transmission fiber enables longer spans reach between terminals and improves Optical Signal to Noise Ratio (OSNR) at the receiver. This improvement together with state of the art FEC and Digital Signal Processing, maximize robustness and distances covered by modern high bit rate digital optical systems.

It is within this context that embodiments of the present invention arise.

DESCRIPTION OF THE SPECIFIC EMBODIMENTS

Figure 1:
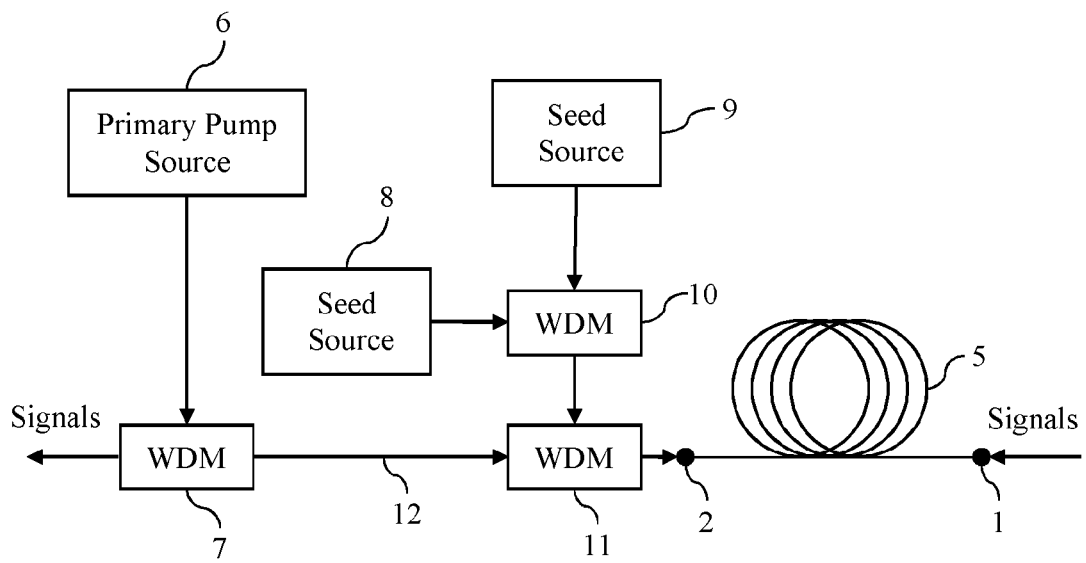
FIG. 1 is a schematic diagram of a conventional system for implementing Higher Order Raman pumping.

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

GLOSSARY

As used herein, the following terms have the following meanings:

Cavity or Optically Resonant Cavity refers to an optical path defined by two or more reflecting surfaces along which light can reciprocate or circulate. Objects that intersect the optical path are said to be within the cavity.

Continuous wave (CW) laser refers to a laser that emits radiation continuously rather than in short bursts, as in a pulsed laser.

Diode Laser refers to a light-emitting diode designed to use stimulated emission to generate a coherent light output. Diode lasers are also known as laser diodes or semiconductor lasers.

Diode-Pumped Laser refers to a laser having a gain medium that is pumped by a diode laser.

Distributed Bragg Reflector refers to a structure formed from multiple layers of alternating materials with varying refractive index, or by periodic variation of some characteristic (such as height) of a dielectric waveguide, resulting in periodic variation in the effective refractive index in the guide. Each layer boundary causes a partial reflection of an optical wave. For waves with a wavelength close to four times the optical thickness of the layers, the many partial reflections constructively interfere and the layers act as a high-quality reflector.

Fiber Bragg Grating refers to a type of distributed Bragg reflector constructed in a short segment of optical fiber by creating a periodic variation in the refractive index of the fiber core. The periodic index variation generates a wavelength-specific dielectric mirror that reflects particular wavelengths of light and transmits all others.

Gain refers to an increase in intensity, power, or pulse energy of a signal that is transmitted from one point to another through an amplifier. The term "unsaturated gain" refers to the increase of a small signal passing through the amplifier, which does not significantly change the inversion level in the amplifier. As used herein gain and unsaturated gain will be used interchangeably.

Gain Medium refers to a material capable of generating optical gain as described below with respect to a Laser.

Infrared Radiation refers to electromagnetic radiation characterized by a vacuum wavelength between about 700 nanometers (nm) and about 1 millimeter (mm).

Laser is an acronym for light amplification by stimulated emission of radiation. A laser is a cavity that contains a lasable material, or gain medium. This is any material—crystal, glass, liquid, semiconductor, dye or gas—the atoms of which are capable of emitting light when pumped, e.g., by other light or an electric discharge. The light emission is stimulated by the presence by a passing photon, which causes the emitted photon to have approximately the same phase and direction as the stimulating photon. The light (referred to herein as stimulated radiation) oscillates within the cavity, with a fraction ejected from the cavity to form an output beam.

Light: As used herein, the term "light" generally refers to electromagnetic radiation in a range of frequencies running from infrared through the ultraviolet, roughly corresponding to a range of vacuum wavelengths from about 100 nanometers ($10^{-7}$ meters) to about 10 micrometers ($10^{-5}$ meters).

Non-linear effect refers to a class of optical phenomena where the linear superposition principle no longer holds (e.g. twice the optical input power does not simply result in twice the optical output power) These effects can typically be viewed only with high intensity, nearly monochromatic, directional beams of light, such as those produced by a laser. Higher harmonic generation (e.g., second-, third-, and fourth-harmonic generation), optical parametric oscillation, sum-frequency generation, difference-frequency generation, optical parametric amplification, and the stimulated Raman Effect are examples of non-linear effects.

Non-linear material refers to materials that possess a non-zero nonlinear dielectric response to optical radiation that can give rise to non-linear effects. Examples of non-linear materials include crystals of lithium niobate ($LiNbO_3$), lithium triborate (LBO), beta-barium borate (BBO), Cesium Lithium Borate (CLBO), KDP and its isomorphs, $LiIO_3$, as well as quasi-phase-matched materials, e.g., PPLN, PPSLT, PPKTP and the like. For certain non-linear effects, e.g., Stimulated Raman Scattering, ordinary optical fiber can act as a nonlinear material.

Optical amplifier refers to an apparatus that amplifies the power of an input optical signal. An optical amplifier is similar to a laser in that it uses a gain medium driven by pumping radiation. The amplifier generally lacks feedback (i.e. a cavity), so that it has gain but does not oscillate. As used herein an optical power amplifier generally refers to the last optical amplifier before delivery of an amplified beam to a target or a wavelength converter. An amplifier stage between a source of radiation and a power amplifier is generally referred to herein as a preamplifier.

Raman Scattering refers to a scattering of incident light by matter in which the scattered light has a lower frequency $\omega_s$ than the incident light $\omega_p$. The difference between the frequencies of the incident and scattered light (referred to as the Raman shift) corresponds to a natural vibrational frequency of the scattering material.

Saturation of an optical amplifier refers to a decrease of the gain coefficient of a medium near some transition frequency when the power of the incident radiation near that frequency exceeds a certain value. If the gain coefficient is constant, the power emitted by the medium is proportional to the incident power. However, there is typically a limit to the rate at which a gain medium can emit power. This limit depends on the lifetimes of the energy levels involved. As this limit is reached, the stimulated transitions become rapid enough to significantly lower the upper energy level population, thereby decreasing the gain coefficient. The effect is to "flatten" the amplified power as a function of input power.

Span Budget refers to the attenuation between the transmitter and receiver of an optical telecommunications system.

Stimulated Raman Scattering (SRS) is a type of Raman scattering that can occur with an intense optical beam. The Raman-scattered light experiences gain and its power increases exponentially. If the power of the incident light exceeds a threshold value, a large portion of the incident light is converted to Raman-scattered light having a lower frequency than the incident light. SRS is also sometimes known as the stimulated Raman effect or coherent Raman effect.

Ultraviolet (UV) Radiation refers to electromagnetic radiation characterized by a vacuum wavelength shorter than that of the visible region, but longer than that of soft X-rays. Ultraviolet radiation may be subdivided into the following wavelength ranges: near UV, from about 380 nm to about 200 nm; far or vacuum UV (FUV or VUV), from about 200 nm to about 10 nm; and extreme UV (EUV or XUV), from about 1 nm to about 31 nm.

Vacuum Wavelength: The wavelength of electromagnetic radiation is generally a function of the medium in which the wave travels. The vacuum wavelength is the wavelength that electromagnetic radiation of a given frequency would have if the radiation were propagating through a vacuum and is given by the speed of light in vacuum divided by the frequency.

Introduction

According to aspects of the present disclosure a higher order Raman pumping scheme for optical telecommunication may use fewer components than a conventional prior art Higher Order Raman pumping schemes.

U.S. Pat. No. 6,480,326 describes a conventional use of Raman laser system for optical telecommunication. In this scheme, primary pump radiation at a wavelength of 1276 nm is launched into a transmission fiber together with radiation from two lower-power secondary sources having wavelengths of 1355 and 1455 nm. Radiation at the 1276-nm wavelength first undergoes stimulated Raman conversion to 1355 nm in the first step of a Raman cascade. In the second step of a Raman cascade, the resulting high power radiation at 1355 nm is converted to yield high power radiation at 1455 nm, which is the pump wavelength required to produce distributed Raman amplification of signals in the 1550-nm region. FIG. 1 depicts an example of a system for implementing such a scheme to provide contra-directional pumping and seed radiation to amplify signals travelling between terminals 1, 2 of a transmission fiber 5. A primary pump source 6 provides the pump radiation at a first wavelength (e.g., 1276 nm) and seed sources (e.g., diode lasers 8, 9) provide seed radiation and second and third wavelengths, respectively, e.g. 1355 nm and 1455 nm. The pump radiation and seed radiation are coupled into a transmission fiber 5 via wavelength division multiplexers (WDM) 7, 10, 11 and a connecting fiber 12. The pump source is coupled to a first WDM 7 and the seed sources 8, 9 are coupled to a second WDM 10, which is in turn coupled to a third WDM 11. The fiber 12 connects the first WDM 7 to the third WDM 11. Signals from the transmission fiber 5 that arrive at terminal 2 are coupled to the third WDM 11.

Figure 2:
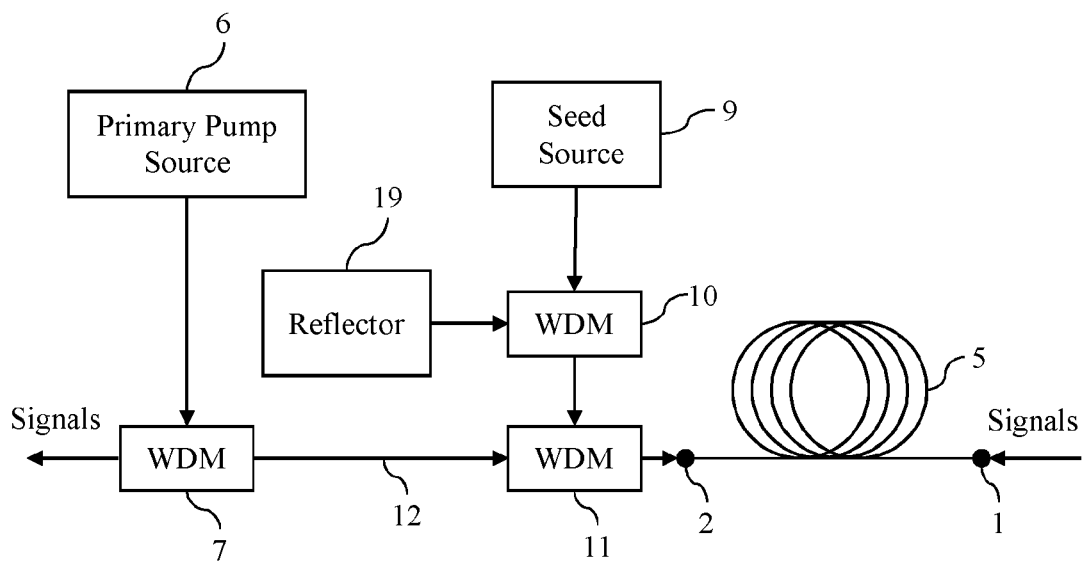
FIG. 2 is a schematic diagram of a conventional system for implementing Higher Order Raman pumping.

FIG. 2 depicts a variation on the system in FIG. 1 in which seed source 8 is replaced with a reflector 19, such as a gold reflector or fiber Bragg grating (FBG). As the primary pump radiation from the pump source 6 propagates down the transmission fiber 5, it undergoes spontaneous Raman scattering, producing radiation with a Raman-shifted spectral profile travelling in both directions in the fiber. The spontaneous Raman scattered radiation is amplified as it travels in the transmission fiber 5 due to the Raman gain provided by pump radiation in the fiber. In addition, some of the outgoing spontaneous Raman scattered radiation undergoes backward Rayleigh scattering and is further amplified as it travels back towards terminal 2. The amplified spontaneous Raman scattered radiation returning to terminal 2 is coupled back through WDMs 11 and 10 to reflector 19. If reflector 19 is a fiber Bragg grating with peak reflectivity at the second wavelength, that part of the spectrum of the amplified spontaneous Raman scattered radiation at the second wavelength reflects back through WDMs 10 and 11 and into the transmission fiber 5. In this example, an amplifying cavity for radiation at the desired seed radiation at the second wavelength is formed by reflector 19 and a distributed Rayleigh 'mirror' into the transmission fiber 5. This leads to the presence of substantial energy at the second wavelength in the transmission fiber 5 in the vicinity of terminal 2, where it performs the same role as the launched seed source at the second wavelength in the system of FIG. 1.

The systems of FIG. 1 and FIG. 2 achieve higher order pumping with a high power fiber Raman laser that uses one or more seed lasers with low pump power. However, the seed laser, being an active optoelectronic diode component, with a limited operating temperature range that typically requires cooling, e.g., thermo-electric cooling (TEC), which adds extra electric power consumption and limits reliability.

Aspects of the present disclosure can implement $3^{rd}$ order Raman pumping to improve span budget up to 2.3 dB with limited extra hardware compared to a traditional first order Raman pumping scheme. This can effectively add up to 13 km extra distance between the terminals with basically the same hardware as a first order Raman pumping system.

Figure 3:
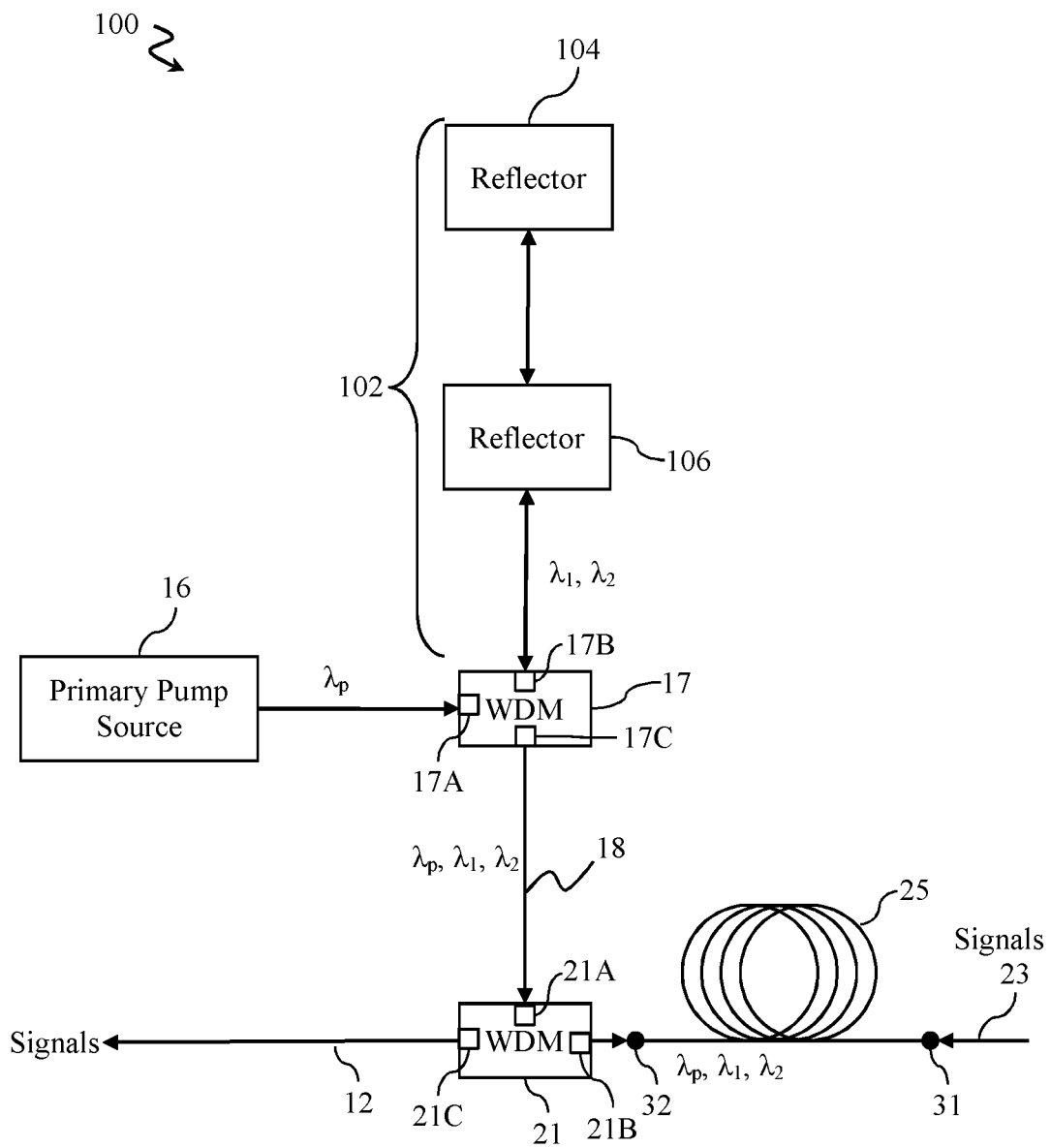
FIG. 3 is a schematic diagram of a system for implementing Higher Order Raman pumping in accordance with aspects of the present disclosure.

According to aspects of the present disclosure, a third order Raman pumping system 100 may be configured as shown in FIG. 3 with two reflectors in series and the elimination of the one of the WDMs in the systems depicted in FIG. 1 and FIG. 2. The elimination of one WDM reduces coupling losses and complexity while improving compactness and reliability at minimal extra cost. The system 100 may generally include a High Power Raman Laser as a primary pump source 16 coupled to a first optical multiplexer 17, which is in turn coupled to a second optical multiplexer 21, e.g., by a length of fiber 18. By way of example, and not by way of limitation, the optical multiplexers 17, 21 may be wavelength division multiplexers (WDM). A transmission fiber 25 carries optical signals between a first terminal 31 and a second terminal 32. By way of example, and not by way of limitation, the transmission fiber 25 may contain a section of erbium-doped fiber that acts as a remotely optically pumped erbium-doped fiber amplifier (EDFA) for wavelengths between approximately 1525-1565 nm (C band), or 1570-1610 nm (L band). The second WDM 21 is coupled to one of the terminals, e.g., the second terminal 32 for contra-directional pumping.

The key component of the system 100 is a length of optical fiber 102 onto which first and second wavelength-selective reflectors 104, 106 are formed. The length of fiber 102 is coupled to the first optical multiplexer 17. The reflectors are configured to selectively reflect radiation at first and second wavelengths. By way of example, and not by way of limitation, the reflectors 104, 106 may be Fiber Bragg Gratings inscribed onto a common piece of optical fiber, e.g., using an excimer laser, fixed or tunable wavelength depending on application. The optical fiber 102 can be relatively short, e.g., between about 4 centimeters and about 10 centimeters depending on how closely together the reflectors 104, 106 can be formed, e.g., in the case of fiber Bragg gratings. A cascaded Raman cavity is formed that uses the transmission fiber 25 as a nonlinear medium, the reflectors 104, 106 at one end of the cavity and Rayleigh scattering in the transmission fiber that acts as a distributed mirror for the other end of the cavity.

In the illustrated example, the first optical multiplexer 17 receives the primary pump radiation $\lambda_p$ from the Primary Pump Source 16 at a first port 17A and transmits the pump radiation toward the fiber 18 via a third port 17C, and transmits radiation of the first and second wavelengths $\lambda_1, \lambda_2$ from second port 17B to third port 17C. The second optical multiplexer 21 is configured to receive the Primary pump radiation and radiation of the first and second wavelengths $\lambda_1, \lambda_2$ via a first port 21A and transmit the pump radiation and radiation of the first and second wavelengths $\lambda_1, \lambda_2$ to the transmission fiber 25 via a second port 21B to pump the transmission fiber to amplify signals 23 travelling therein. The signals 23 are received at the second port 21B and transmitted via a third port 21C, e.g., to another length of transmission fiber (not shown) or to a terminal component of an optical telecommunications system, e.g., an optical add/drop multiplexer, wavelength selective switch, or other component like a Low Noise Preamplifier EDFA.

By way of example, and not by way of limitation, the fiber 102 may be configured so that there is Raman gain and wavelength conversion of pump radiation at 1276 nm to 1362-nm radiation, and additional Raman gain and wavelength conversion of the 1362-nm radiation to 1455-nm radiation, between reflectors 104 and 106 and transmission fiber 25 acting as a distributed Rayleigh mirror. The 1455-nm radiation is coupled to the transmission fiber 25 to provide pumping to amplify the 1550 nm signals travelling in the transmission fiber. Those skilled in the art will recognize that other combinations of wavelengths may be used depending on the wavelength of signals to be amplified in the transmission fiber 25.

Another common application implementing the same configuration could be designed to use 1310 nm radiation from the Primary Pump Source 16, 1390 nm as the first wavelength $\lambda_1$ and 1480 nm as the second wavelength $\lambda_2$.

The system 100 provides the benefit of a $3^{rd}$ order pump without the cost, complexity and coupling loss of extra components, e.g., seed lasers and an extra multiplexer. The system uses passive components, reflectors, fixed or tunable, which are more reliable and less expensive than seed lasers. By forming the reflectors 104, 106 on the same piece of fiber coupling losses can be reduced, packaging can be simplified and reliability improved. By contrast, using two reflectors in a system of the type shown in FIG. 1 and FIG. 2 would result in an arrangement in which there would be a WDM 10 between the two reflectors, which would introduce a higher coupling loss.

While the above is a complete description of the preferred embodiment of the present invention, it is possible to use various alternatives, modifications and equivalents. Therefore, the scope of the present invention should be determined with reference to the appended claims, along with their full scope of equivalents. Any feature, whether preferred or not, may be combined with any other feature, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for".

What is claimed is:

1. A system, comprising:
    an optical multiplexer having first, second and third ports, the first port being configured to receive pump radiation and transmit the pump radiation to the third port; and
    an optical fiber optically coupled to the optical multiplexer at the second port, the second port being configured to receive radiation from the optical fiber and transmit it to the third port, wherein first and second wavelength-selective reflectors are formed onto the optical fiber, wherein the first wavelength selective reflector is configured to reflect radiation of a first wavelength and the second wavelength reflective selector is configured to reflect radiation of a second wavelength that is longer than the first wavelength, wherein the first and second wavelengths are selected such that Raman scattering and gain in a transmission fiber converts primary pump radiation at a primary pump wavelength less than the first wavelength to radiation of the first wavelength and also convert radiation of the first wavelength to radiation of the second wavelength.

2. The system of claim 1, wherein the first wavelength selective reflector is a fiber Bragg grating formed onto the optical fiber.

3. The system of claim 1, wherein the second wavelength selective reflector is a fiber Bragg grating formed onto the optical fiber.

4. The system of claim 1, wherein the first and second wavelength selective reflectors are fiber Bragg gratings formed onto the optical fiber.

5. The system of claim 1, further comprising a second optical multiplexer optically coupled to the optical multiplexer via the third port, whereby the optical multiplexer is a first multiplexer.

6. The system of claim 5, wherein the second optical multiplexer is configured to receive the radiation of the first and second wavelengths at a first port and transmit the radiation of the first and second wavelengths toward the transmission fiber via a second port.

7. The system of claim 6, wherein the second optical multiplexer is configured to receive the primary pump radiation and the radiation of the first and second wavelengths at the second port and transmit the primary pump radiation and the radiation of the first and second wavelengths toward the third port of the optical first multiplexer via the first port of the second optical multiplexer.

8. The system of claim 7, wherein the second optical multiplexer is configured to transmit the signals from the second port of the second optical multiplexer to a third port of the second optical multiplexer.

9. The system of claim 5, wherein the first optical multiplexer is a wavelength division multiplexer.

10. The system of claim 5, wherein the second optical multiplexer is a wavelength division multiplexer.

11. The system of claim 5, wherein the first and second optical multiplexers are wavelength division multiplexers.

12. The system of claim 5, further comprising a primary pump source, wherein the primary pump source is optically coupled to the first port of the first optical multiplexer.

13. The system of claim 1, wherein the optical fiber is between about 4 centimeters and about 10 centimeters in length.

14. The system of claim 1, wherein the optical multiplexer and the optical fiber with the first and second wavelength selective reflectors are arranged in a single package that is less than about four centimeters on any side or in diameter.

15. The system of claim 1, wherein the optical fiber and first and second wavelength selective reflectors are fixed or tunable and configured such that Raman scattering and gain in the transmission fiber converts pump radiation at the pump wavelength to radiation of the first wavelength and also convert radiation of the first wavelength to radiation of the second wavelength, wherein the primary pump wavelength is 1276 nm, the first wavelength is 1362 nm the second wavelength is 1455 nm.

16. The system of claim 1, wherein the optical fiber and first and second wavelength selective reflectors are fixed or tunable and configured such that Raman scattering and gain in the transmission fiber converts pump radiation at the pump wavelength to radiation of the first wavelength and also convert radiation of the first wavelength to radiation of the second wavelength, wherein the primary pump wavelength is 1310 nm, the first wavelength is 1390 nm the second wavelength is 1480 nm.

* * * * *